(No Model.) 4 Sheets—Sheet 1.
A. BRADFORD.
COMBINED AGRICULTURAL MACHINE.
No. 277,982. Patented May 22, 1883.
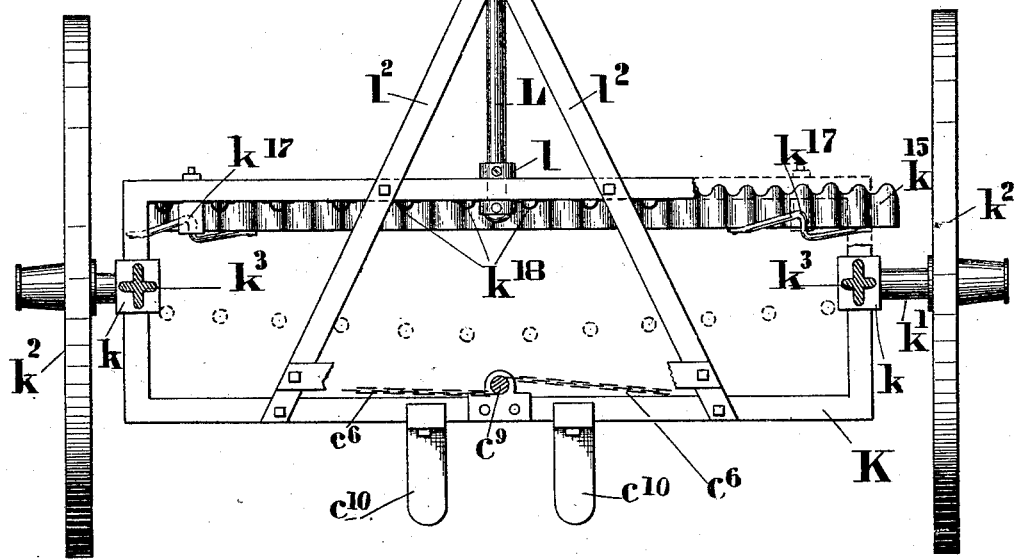
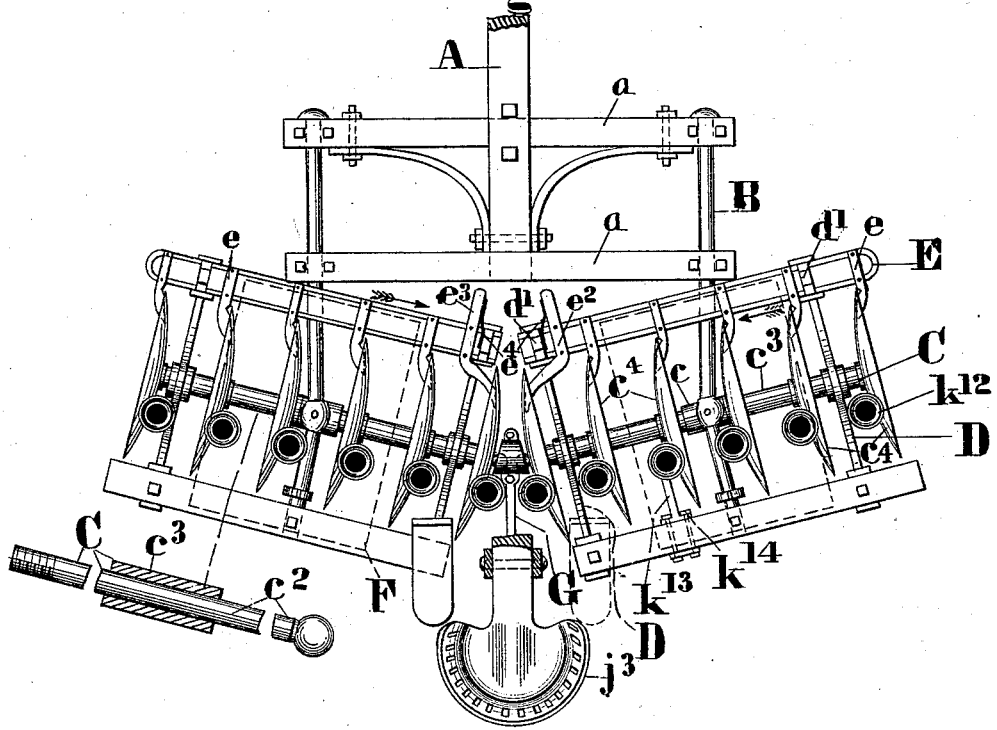
WITNESSES:
T. S. West.
Wm. T. Emerson.
INVENTOR:
ALLEN BRADFORD,
BY H. W. Beadle & Co.
ATTYS.
N. PETERS. Photo-Lithographer. Washington, D. C.

(No Model.) 4 Sheets—Sheet 2.

A. BRADFORD.
COMBINED AGRICULTURAL MACHINE.

No. 277,982. Patented May 22, 1883.

WITNESSES:
T. S. West
Wm. T. Emerson

INVENTOR:
ALLEN BRADFORD,
BY H. W. Beadle & Co.
ATTYS.

(No Model.)   4 Sheets—Sheet 3.
A. BRADFORD.
COMBINED AGRICULTURAL MACHINE.
No. 277,982.   Patented May 22, 1883.
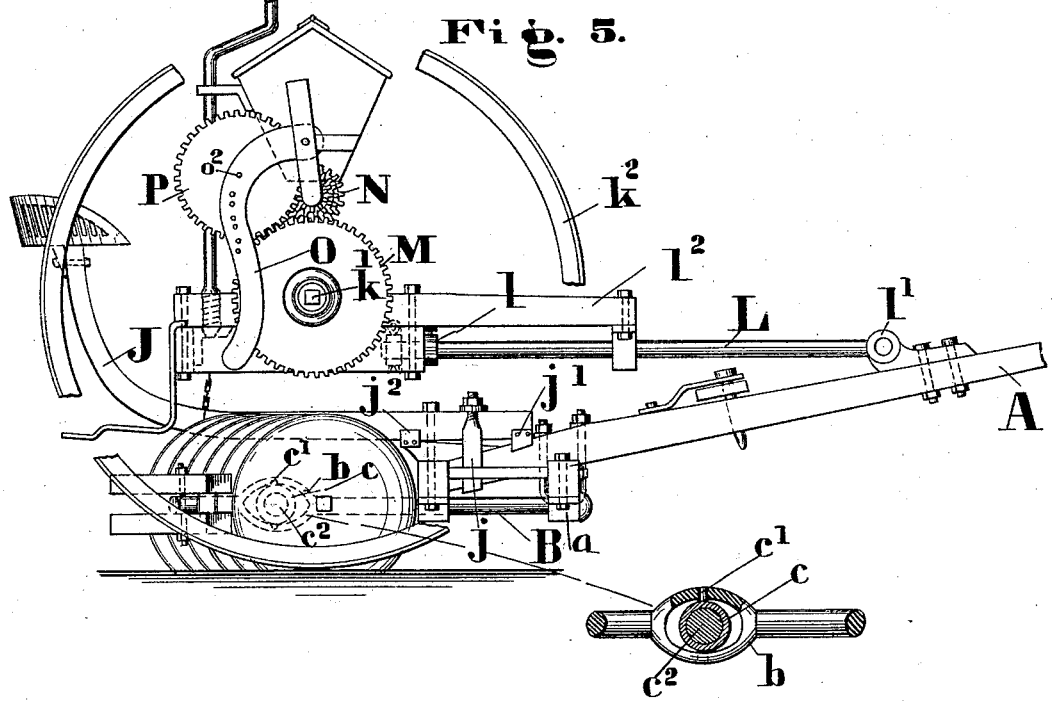
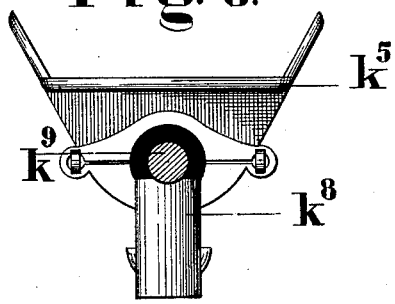
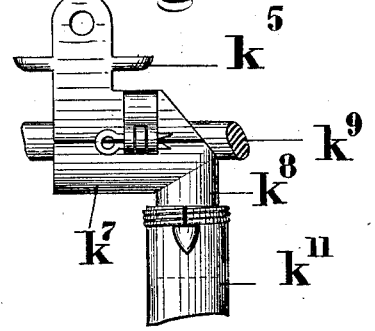
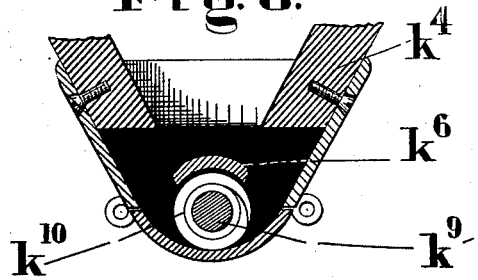
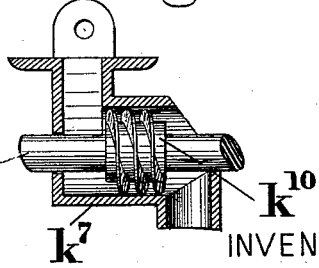
WITNESSES:
T. S. West
Wm. T. Emerson
INVENTOR:
ALLEN BRADFORD,
BY H. W. Beadle & Co.
ATTYS.

(No Model.) 4 Sheets—Sheet 4.
A. BRADFORD.
COMBINED AGRICULTURAL MACHINE.
No. 277,982. Patented May 22, 1883.
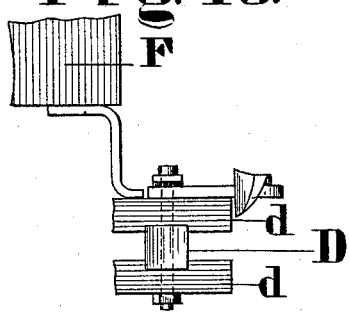
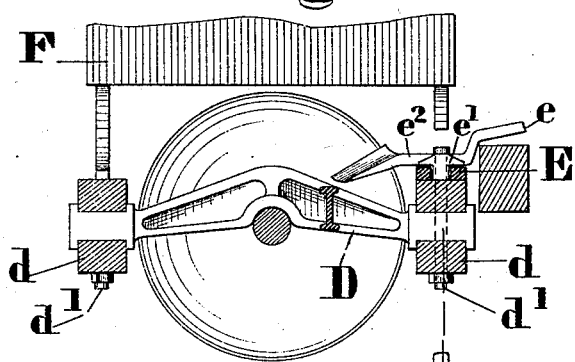
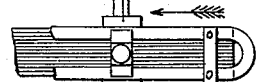
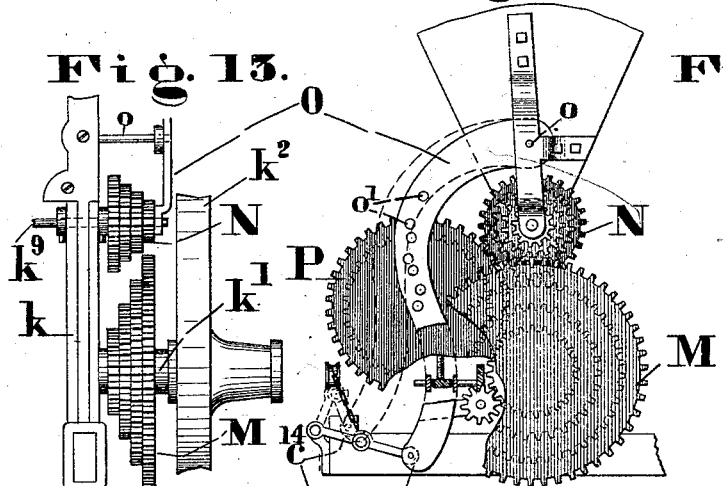
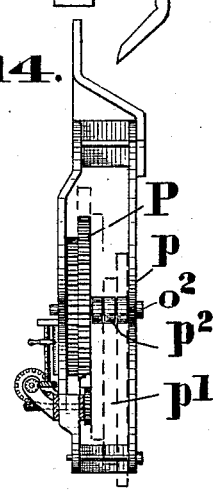
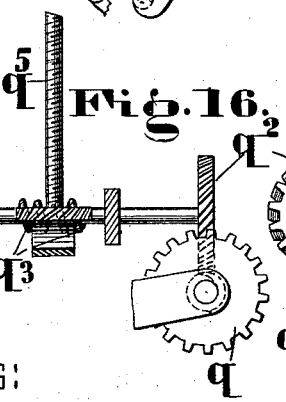
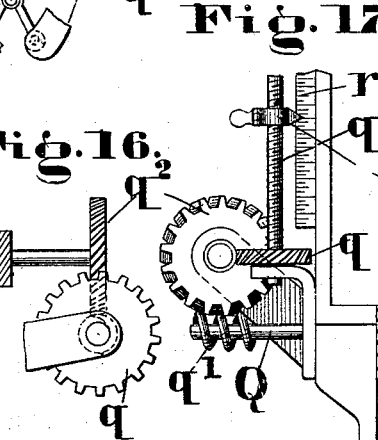
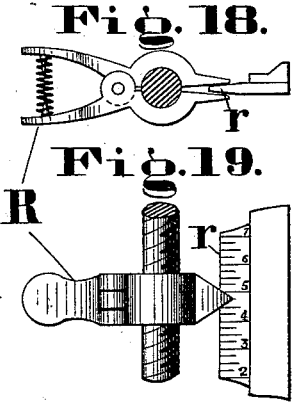
WITNESSES:
T. S. West
Wm. T. Emerson
INVENTOR:
ALLEN BRADFORD,
BY H. W. Beadle & Co.
ATTYS.

UNITED STATES PATENT OFFICE.

ALLEN BRADFORD, OF DALLES, OREGON.

COMBINED AGRICULTURAL MACHINE.

SPECIFICATION forming part of Letters Patent No. 277,982, dated May 22, 1883.

Application filed June 28, 1882. (No model.)

*To all whom it may concern:*

Be it known that I, ALLEN BRADFORD, of Dalles, county of Wasco, and State of Oregon, have invented new and useful Improvements in a Combined Agricultural Machine; and I do hereby declare that the following is a full and exact description of the same, reference being had to the accompanying drawings, and to the letters of reference marked thereon.

This invention consists, mainly, in a special construction and adaptation of parts, by means of which several distinct machines are combined in one implement, as will be fully described hereinafter.

Figure 3:
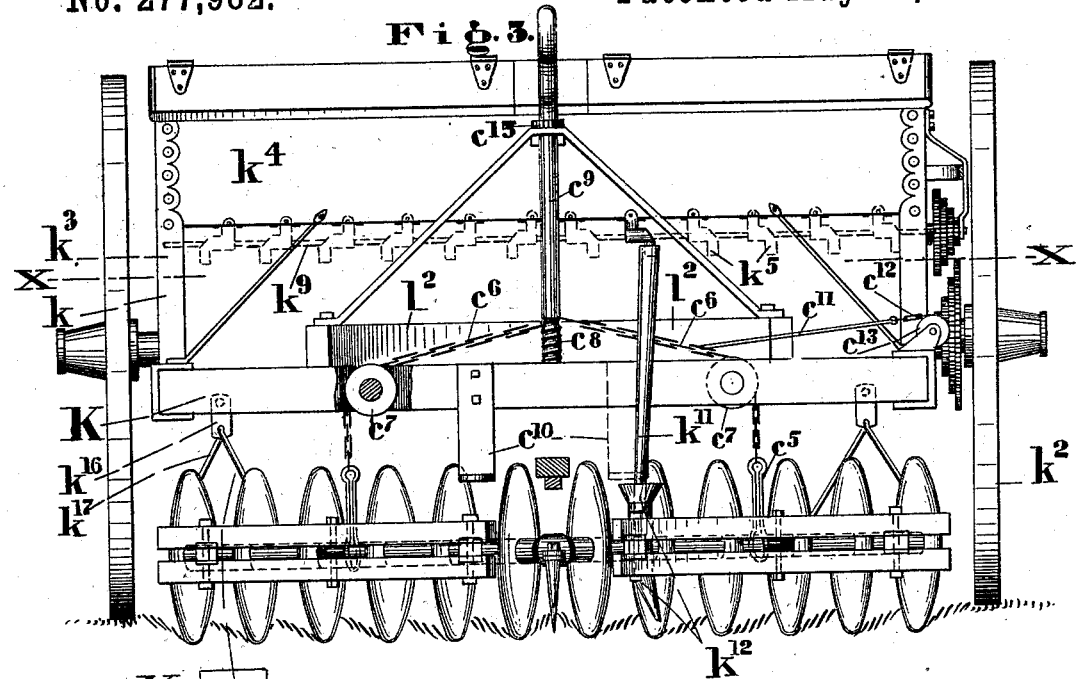
Figure 4:
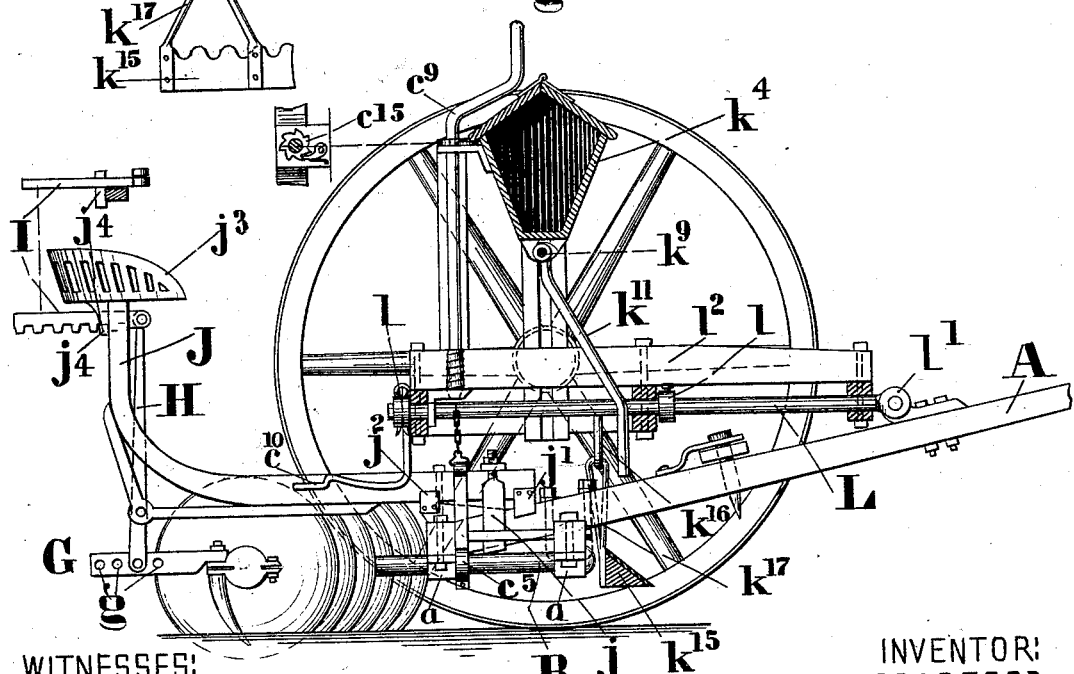

In the drawings, Figure 1 is a horizontal section of the implement on the line $xx$, Fig. 3, with the harrow and the cone-gearing removed to better show the remaining parts; Fig. 2, a plan view of the harrow; Fig. 3, a rear view of the implement; Fig. 4, a transverse vertical section, showing the machine set for broadcast sowing; Fig. 5, a side view, showing the machine set for drilling. Figs. 6, 7, 8, and 9, detail views of the seed-cup and conveyer enlarged; Figs. 10 and 11, detail views of the scraper-beam enlarged; Figs. 12, 13, and 14, detail views of the cone-gearing enlarged; Fig. 15, an enlarged view of the clamping-iron, by means of which the chain of the lifting mechanism is united to the disk-shaft; and Figs. 16, 17, 18, and 19, detail views of the land-measurer enlarged.

To enable others skilled in the art to make my combined machine and properly use the same, I will proceed to describe fully its construction and manner of operation.

A, Figs. 2 and 4, represents the tongue of the implement, to which the horses are secured in any proper manner.

$a\ a$ represent transverse beams, rigidly secured to the tongue at its rear end, for the purpose of furnishing a proper frame-work for the support of the other parts.

B B represent draft-irons, the front ends of which are held in proper bearings in the beams $a\ a$, in such manner as to turn freely therein.

$b$, Fig. 5, represents a portion near the rear end of each iron, which, having been divided and separated, is provided with recesses or bearings adapted to receive the journals $c'\ c'$ of the sleeve $c$, centrally located on the disk-shaft C, as shown in Fig. 2. By means of this special construction the disk-shaft is made capable of adjustment in a horizontal plane, for the purpose of changing its angle relative to the line of draft, and also in a vertical plane to accommodate itself to the unevenness of the ground, the former adjustment resulting from the oscillation of its sleeve $c$, in the divided and separated portion of the draft-iron, and the latter adjustment from the oscillation of the draft-iron B in its bearings.

C, Fig. 2, represents the disk-shaft before referred to, which consists of a rod, $c^2$, and sleeves $c^3\ c^3$, located on the rod between the disks $c^4$, as shown. The rod $c^2$ is provided at one end with a ball adapted to engage with a corresponding socket to form a ball-and-socket joint and at the other with a threaded portion adapted to receive a nut. By means of this construction the disks and sleeves are clamped together to form a single structure.

$c^5$, Figs. 3 and 15, represents a clamping-iron, the lower end of which is adapted to receive and hold the draft-irons B B, and the upper end of which is connected to the chain $c^6$, as shown.

$c^7\ c^7$ represent pulleys supported on the frame K, over which the chains $c^6$—one on each side—pass to the upper end of the casting $c^8$ of the vertical crank-shaft $c^9$, as shown.

$c^{10}\ c^{10}$, Figs. 3 and 4, represent adjustable stirrups, upon which the driver may stand when he wishes to raise the harrow from the ground.

$c^{11}$, Fig. 3, represents a rod extending away from the chain $c^6$ to the chain $c^{12}$, the latter passing over the pulley $c^{13}$ to the lever $c^{14}$, Fig. 12, as shown.

$c^{15}$, Figs. 3 and 4, represents a ratchet and pawl, or other proper device, by means of which the crank-shaft is secured in any desired position when the disks are elevated.

D D, Figs. 2 and 11, represent longitudinal beams resting upon the disk-shafts, near each end of the same, and $d\ d$ transverse beams uniting together the ends of the beams D D, the two being united by means of bolts $d'\ d'$, as shown. By means of this construction a frame-work is located upon the disk-gangs for supporting the scraper-beam, the weight-box, and the drill-tubes, as shown.

E, Figs. 2 and 11, represents a scraper-beam consisting of a metal bar of suitable length, bent upon itself in the middle to form parallel portions, to which the fixed ends of the scraper-plates $e$ $e$ are riveted.

$e'$ $e'$, Figs. 2 and 11, represent T-shaped plates, held in place by the bolts $d'$ $d'$, by means of which plates the scraper-beam is secured in position without interfering with its freedom of movement in a longitudinal direction, a proper space being formed between the piece E and the plates $e'$, as shown in Fig. 11.

$e^2$ represents a larger scraper, located on the inner end of the scraper-piece E, which is provided with an extension, $e^3$, by means of which the scraper-beam E may be moved longitudinally in the direction of the arrow, Fig. 2, when desired, for the purpose of bringing the scrapers in contact with the disks. This movement is effected by the driver, who swings the heel of his foot, the front of which rests upon the rear bar $a$, around against the extension $e^3$, and gives it movement in the proper direction, as indicated by the arrow.

$e^4$, Fig. 2, represents a spring secured at one end to the extension $e^3$, the free end of which bears against the head of bolt $d'$, as shown. By means of this spring the return movement of the scraper-piece E is effected when the same is released by the driver.

F, Figs. 10 and 11, represents a weight-box supported upon the frame-work of the disk-shaft, as indicated in dotted lines, Fig. 2, the purpose of which is to balance the weight of the driver, so as to relieve the necks of the horses from strain and cause the harrow to cut in hard ground.

G, Fig. 4, represents a connecting-bar united at its front end in any proper manner to the socket-piece of the ball-and-socket joint, which is common to both disk-shafts, and its rear end to the short arm of lever H, as shown.

$g$ represents one of a series of openings, by means of which the position of the end of the lever H on the bar may be adjusted at will.

I represents a rack-bar secured to the upper end of the lever H, and $j^4$ a stop-bar or projection upon the flange of the seat, by means of which the rack, when adjusted, may be held in any position desired. By means of this lever and its connections the disk-shafts may be adjusted in a horizontal plane for the purpose of obtaining any desired angle to the line of draft.

J represents the seat-support, consisting of a wooden bar bent into a curved form, as shown, which is adjustably secured at its front end to the tongue and frame-work by means of the clamping-iron $j$, as shown.

$j'$ $j^2$ represent irons, by means of which the support, when adjusted in a longitudinal direction, is properly guided.

$j^3$ represents the seat, and $j^4$ the projection upon the flange, before referred to, by means of which the rack-bar of the adjusting-lever is held in any desired position.

The foregoing description relates, principally, to a rotary harrow which is complete and perfect in itself. The operation of the same is substantially as follows: The general operation of the harrow is like others of its class. The frame is capable of vertical oscillation on the draft-rod B, to accommodate itself to the unevenness of the ground, and the disk-shaft may be adjusted in horizontal planes to obtain any desired angle to the line of draft, this latter adjustment being effected by means of the lever H and the rack-bar I. The scraper-beams, when in their normal position, do not permit the scrapers to bear against the disks, these being held out of contact with them by the action of the spring $e^4$. When desired, however, these may be thrown into position to clean the disks by the action of the driver, who swings his heel against the extensions $e^3$, and thus causes the scraper-beam to move in a longitudinal direction against the action of spring $e^4$. The seat of the harrow may be readily adjusted to suit drivers of different weights. By means of its curved form it is possible to advance the harrow beneath the seeding-machine without interference with it. By means of the weight-box and the adjustable seat, also, the weight carried by the harrow, either by changing the position of the seat or by changing the position of the earth in the boxes, may be so adjusted as not to rest upon the horses' necks. When it is desired to lift the harrow for the purpose of turning the machine around, or for other purposes, the driver, to avoid lifting his own weight, may stand upon the stirrups $c^{10}$. By simply revolving the crank-shaft $c^9$ the disk-shafts will be lifted by the chains $c^6$ high enough to clear the disks from the ground. The oscillation of the disk-shafts from the turning of the draft-irons B will be effectually prevented by the clamping-iron $c^5$. By the lifting of the harrow, also, the seed-feeding mechanism will be thrown out of gear, in a manner hereinafter described.

The drilling and seeding attachment will now be described.

K, Figs. 3 and 4, represents the frame of the attachment, and $k$, Fig. 3, a casting, which is provided at its lower end with a socket adapted to inclose the central portion of the end beam of the frame, as shown in Fig. 1. $k'$, Fig. 1, represents the axle, extending from the casting, as shown, and $k^2$ the wheel, by means of which the axle is supported.

$k^3$, Fig. 3, represents a vertical extension of the casting $k$, which terminates above in a flanged plate of triangular shape, which forms the end of the hopper $k^4$.

L, Figs. 4 and 5, represents a coupling-iron, the rear end of which is secured to the frame-work of the attachment by means of the collars $l$ $l$, as shown, and the front end of which is removably attached to the tongue by means of the hinge-joint $l'$, as shown in Fig. 4.

$l^2$ $l^2$, Figs. 1 and 4, represent brace-bars, united at the front ends to the coupling-rod L by means of a casting, as shown, and at the rear ends to the frame K, as shown.

$k^4$, Figs. 3 and 4, represents the hopper before referred to, into which the seed is introduced through any proper opening.

$k^5$, Figs. 6, 7, and 8, represents a casting attached to the bottom of the hopper below a proper opening through the same, which is provided with a central plate, $k^6$, Fig. 8, to properly direct the seed in its fall, a longitudinal extension, $k^7$, Figs. 7 and 9, having openings through the walls of the same, and a vertical extension, $k^8$, as shown.

$k^9$ represents the feed-shaft, hereinafter referred to, and $k^{10}$ one of a series of screw-conveyers located on said shaft.

$k^{11}$, Figs. 3, 4, and 7, represents a flexible tube, attached to the vertical extension $k^8$ in any proper manner, which extends downward and opens into the mouth of the drill-tube $k^{12}$, Fig. 2, attached to frame of the harrow by the arm $k^{13}$ and base-plate $k^{14}$, as shown.

$k^{15}$, Figs. 1 and 4, represents a scattering-board, made preferably of wood, with a transversely grooved or scalloped surface covered with soft rubber.

$k^{16}$ $k^{16}$ represent hangers depending from the front beam of the frame K, and $k^{17}$ links by means of which the board is loosely supported in an inclined position, as shown in Fig. 4.

$k^{18}$ $k^{18}$, Fig. 1, represent clasps, by means of which the lower ends of the flexible delivering-tubes $k^{11}$ are held in proper position over the scattering-board.

The operation of the drilling and seeding attachment is substantially as described.

The attachment may be so adjusted on the coupling-rod L as to occupy a forward position, as shown in Fig. 4, or a rearward position, as shown in Fig. 5. When in the former position the implement is adapted for use as a broadcast seeder. The free ends of the flexible tubes $k^{11}$ are passed through the clasps $k^{18}$, Fig. 1, and are thus held in proper position over the scattering-board, as shown in Fig. 4. The seed placed in the hopper gravitates to the bottom of the casting $k^5$, and, by the action of the feeding-shaft and its conveyer, is carried away from the opening through the bottom of the hopper to the space above the vertical extension $k^8$, where, being unsupported, it falls through the tube $k^{11}$ to the scattering-board, and is by it evenly scattered over the ground. The casting $k^5$, it will be observed, is made in two parts, so that when desired the interior space of the same may be reached. The attachment, also, when in its forward position, may be used for drilling by simply removing the scattering-board, when the seed, instead of being scattered broadcast, will be dropped in parallel rows on the ground and be covered up by the harrow-disks. When the attachment is in a rearward position it is adapted for use as a drill, the flexible tubes $k^{11}$ in this case being extended to the mouths of the drill-tubes $k^{12}$, as shown in Fig. 3, the seed by this action being deposited in the ground in the rear of the harrow-disks in the furrows where the earth will fall upon it. The amount of seed delivered in a given time will depend upon the rapidity with which the feed-shaft revolves, its movement being determined by mechanism hereinafter described.

When it is desired to use the harrow without the seeding attachment, the latter may be readily removed from the former by taking out the bolt of the coupling-joint $l'$.

The cone-gearing for determining the rapidity of the revolution of the feed-shaft will now be described.

M, Figs. 12 and 13, represents a cone-pulley, which is located upon one of the axles, $k'$, between the wheel and the hopper, and is rigidly connected to the hub of the wheel in such manner as to revolve with the same when the latter is in motion. N also represents a cone-pulley, located on the outer end of the feed-shaft $k^9$, between the bracket-iron $m$ and the hopper, as shown. These two cone-pulleys are located in the same vertical plane, as shown in Fig. 13, without being in contact with each other, the positions of the cones being reversed in the usual manner.

O, Figs. 5 and 12, represents a frame-plate, the upper end of which is pivoted at $o$, Fig. 12, between the hopper and a suitable supporting-bracket, which is provided with a series of holes, $o'$, and a removable stud or pin, $o^2$, as shown in Fig. 14.

P represents a cog-wheel supported by the pin, but loose thereon, which is provided with the bearing-faces $p\,p'$, of different diameters, as shown.

$p^2\,p^2$ represent loose rings on the stud or pin $o^2$, by means of which the lateral position of the wheel upon the stud may be determined at will.

The operation of this cone-gearing is substantially as follows: The gear-wheel P is adjusted on the shaft $o^2$ by means of the rings $p^2$ to bring the same into the proper lateral position to engage with the desired teeth of the cone-wheels M N, and the stud $o^2$ is itself adjusted to cause this wheel to swing properly into place. When the wheel P is in the position shown in full lines, Fig. 14, four different adjustments are possible, according to the lateral position of the wheel P upon the stud $o^2$, and by turning the wheel into the position shown in dotted lines four other adjustments are possible. When all the parts are in their proper positions and the proper adjustments have been made the feeding mechanism will continue in action, when the machine is moving, as long as the harrow remains in its normal position. When, however, the harrow is raised the joint of lever $c^{14}$, Fig. 12, will be raised also by the construction previously described, and the frame O being swung away from the gears M N, the feeding action will cease.

The operation of this mechanism is substantially as follows: The gear-wheels may be located upon the stud $o^2$ by means of the rings in the proper lateral position to engage with the selected gears of the cones M N. The stud $o^2$ is then adjusted in the frame to bring the wheel P into the proper vertical position. The lever $c^{14}$ then being connected to the frame, feeding from the hopper will commence, if the harrow is down, as soon as the machine moves.

The land-measurer will now be described.

Q, Fig. 17, represents a shaft hung in the frame-plate O near its lower end, which is provided at its outer ends with a gear-wheel, $q$, adapted to engage with the small cog-wheel of cone M, as shown in Fig. 12.

$q'$ represents a worm on the other end of the shaft, by means of which motion is communicated to the gear-wheel $q^2$, the shaft of which has a worm, $q^3$, Fig. 16, actuating the wheel $q^4$, having the threaded shaft $q^5$, as shown.

R, Figs. 18 and 19, represents a spring clamping device, having an internal-threaded portion corresponding with the threads of the shaft $q^5$, which is adapted to serve as a pointer to indicate, in connection with the scale $r$, the distance traveled by the machine. The pointer, after having been moved to any position, may be unclamped from the shaft and be returned to the starting-point, if it is desired to begin a new measurement.

The operation of the land-measurer is substantially as follows: Whenever the feeding mechanism is in operation the pointer of the land-measurer, through the mechanism described, is caused to travel along the scale to indicate the area planted.

The device being attached to the frame O, it follows that its action will be arrested whenever the frame is swung away from the gears by the action of the lever $c^{14}$.

The general advantage of this special construction is that several distinct mechanisms are combined in one machine.

By means of it seed may be sown in three distinct ways—that is, it may be scattered broadcast or it may be drilled either into the ridges or the furrows, according as the climate may be dry or moist.

The construction of the scatterer is such that the seed will be distributed evenly, even on inclined ground—a result which cannot be accomplished with those machines which employ a cone-shaped distributer.

By the employment of a rotary harrow in connection with the drill the tendency of the machine to gather trash is avoided.

The harrow may be used independently whenever desired without impairing its capacity for use in the combined machine.

The weight-box may be used, if desired, when the harrow is used independent of the seeding attachment to enable it to cut to the depth desired in hard ground.

Having thus fully described my invention, what I claim as new, and desire to secure by Letters Patent, is—

1. In combination with a rotary-disk harrow, the independent seeding attachment supported upon wheels and adjustably connected to the coupling-iron L, the latter having the hinge-joint $l'$ detachably secured to the tongue of the harrow, whereby the seeding attachment may be adjusted forward and back, as described, and may rise and fall vertically relatively to the harrow, substantially as and for the purpose set forth.

2. In combination with the harrow, substantially as described, and mechanism, substantially as described, for feeding the seed, the mechanism for lifting the harrow, and the chain $c^{12}$, lever $c^{14}$, and frame O for throwing the feeding mechanism out of gear when the harrow is raised.

3. In combination with the lifting mechanism $c^5$ $c^6$ $c^8$ $c^9$, the rod $c^{11}$, chain $c^{12}$, with folding lever $c^{14}$, and frame O for changing the gears, as described.

4. In combination with the crank-shaft $c^9$, chain $c^6$, and pulleys $c^7$, the clamping-iron $c^5$ for holding the disk-shafts against oscillation when raised.

5. In combination with lifting mechanism, substantially as described, and the frame O, carrying the gear, the folding lever $c^{14}$, as and for the purpose set forth.

This specification signed and witnessed this 3d day of June, 1882.

ALLEN BRADFORD.

Witnesses:
GEO. WATKINS,
R. W. CRANDALL.